United States Patent
Tanabe

(10) Patent No.: US 8,614,173 B2
(45) Date of Patent: Dec. 24, 2013

(54) WATER TREATMENT METHOD

(75) Inventor: Shigeru Tanabe, Yokohama (JP)

(73) Assignee: Dia-Nitrix Co., Ltd., Tokyo (JP)

( * ) Notice: Subject to any disclaimer, the term of this patent is extended or adjusted under 35 U.S.C. 154(b) by 477 days.

(21) Appl. No.: 12/294,123

(22) PCT Filed: Mar. 22, 2007

(86) PCT No.: PCT/JP2007/055856
§ 371 (c)(1),
(2), (4) Date: Sep. 23, 2008

(87) PCT Pub. No.: WO2007/119479
PCT Pub. Date: Oct. 25, 2007

(65) Prior Publication Data
US 2009/0065443 A1  Mar. 12, 2009

(30) Foreign Application Priority Data
Mar. 24, 2006 (JP) .................. 2006-083196

(51) Int. Cl.
*B01F 17/00* (2006.01)
*B01D 21/00* (2006.01)
*B01D 21/01* (2006.01)
*B03D 1/002* (2006.01)

(52) U.S. Cl.
USPC ................ 508/165; 210/702; 210/726

(58) Field of Classification Search
USPC ............... 508/165; 210/726, 702
See application file for complete search history.

(56) References Cited

U.S. PATENT DOCUMENTS

| | | | |
|---|---|---|---|
| 2003/0018092 A1 * | 1/2003 | Inagaki et al. | 521/40.5 |
| 2004/0238454 A1 * | 12/2004 | Mori et al. | 210/723 |
| 2006/0160227 A1 * | 7/2006 | Sethumadhavan et al. | 436/56 |
| 2006/0283806 A1 * | 12/2006 | Kojima et al. | 210/725 |

FOREIGN PATENT DOCUMENTS

| | | |
|---|---|---|
| CN | 1303355 | 7/2001 |
| JP | 62 205112 | 9/1987 |
| JP | 63 158200 | 7/1988 |
| JP | 2 31900 | 2/1990 |
| JP | 07-008969 A | 1/1995 |
| JP | 7-328644 | 12/1995 |
| JP | 9-141006 | 6/1997 |
| JP | 10-180008 | 7/1998 |
| JP | 10-230300 | 9/1998 |
| JP | 11 77062 | 3/1999 |
| JP | 2000 15300 | 1/2000 |
| JP | 2000-500387 A | 1/2000 |
| JP | 2002 45892 | 2/2002 |
| JP | 2002-045900 | 2/2002 |
| JP | 2002-58909 | 2/2002 |
| JP | 2002-66209 | 3/2002 |
| JP | 2002143900 A * | 5/2002 |
| JP | 2002-177709 | 6/2002 |
| JP | 2002 292207 | 10/2002 |
| JP | 2002-346572 | 12/2002 |
| JP | 2003-508221 A | 3/2003 |
| JP | 2003-170172 | 6/2003 |
| JP | 2003-305318 A | 10/2003 |
| JP | 2004-008850 | 1/2004 |
| JP | 2004 25109 | 1/2004 |
| JP | 2005-789 | 1/2005 |
| JP | 2005-7354 | 1/2005 |
| JP | 2005-13892 | 1/2005 |
| JP | 2005 112898 | 4/2005 |
| JP | 2006-297299 | 11/2006 |
| WO | WO 97/18167 A1 | 5/1997 |
| WO | WO 01/17914 A1 | 3/2001 |

OTHER PUBLICATIONS

"Guideline of Development Research of Water Purification Techniques for Reduction of Environmental Impact (e-Water)", Japan Water Research Center, Aug. 2005, pp. 178 and 201-202 (with English translation).

"Regarding Safety of Polymer Flocculant (Anion / Nonion)", published by Organic Flocculant Environmental Council, Apr. 2003, pp. 17-20 (with English translation).

"Sewage Test Method, First Volume, 1997", edited by Japan Sewage Works Association, pp. 103, 116, and 308-309 (with English translation).

"New Edition Polymer Dictionary", edited by Society of Polymer Science, published by Asakura Publishing Co. Ltd., Nov. 25, 1988, p. 107 (with English translation).

Office Action issued Nov. 29, 2011, in Japanese Patent Application No. 2006-083196 (with English-language translation).

Japanese Office Action issued Nov. 6, 2012 in corresponding Japanese Application No. 2006-083196 (with an English Translation).

Office Action issued Sep. 10, 2013, in Japanese patent application No. 2006-083196 (w/English translation).

* cited by examiner

*Primary Examiner* — Cephia D Toomer
*Assistant Examiner* — Vishal Vasisth
(74) *Attorney, Agent, or Firm* — Oblon, Spivak, McClelland, Maier & Neustadt, L.L.P.

(57) ABSTRACT

A water treatment method according to the present invention comprises adding an amphoteric polymer flocculant to polluted water to flocculate suspended solids so that the polluted water becomes treated water, and filtering the treated water. An inorganic flocculent can be added to the treated water after flocculation treatment before filtering the treated water.

13 Claims, No Drawings

WATER TREATMENT METHOD

This application is a 371 of PCT/JP2007/055856, filed Mar. 22, 2007.

TECHNICAL FIELD

The present invention relates to a water treatment method of purifying polluted water.

Priority is claimed on Japanese Patent Application No. 2006-083196, filed on Mar. 24, 2006, the content of which is incorporated herein by reference.

BACKGROUND ART

A typical method of treating polluted water such as waste water is a method of separating sludge by flocculation precipitation or floatation separation which contains generating floc by adding an inorganic flocculant and then adding a polymer flocculant to the polluted water. A part of treated water by such a method may be effectively used; however, most of the treated water is not effectively used because there are problems in water quality and stability of treatment. Usually, the treated water is discharged into a river or the like. If polluted water is subjected to an advance treatment including filtrations such as microfiltration (MF), ultrafiltration (UF); and sand filtration, it is anticipated to improve water quality and obtain available water. However, since filtration speed is low and a filtration layer tends to clog severely due to a suspended material included in the polluted water, it is difficult to realize.

An example of a method of purifying water for obtaining purified water which is able to be used as tap water contains a sand filtration step or a membrane filtration after treating with a flocculation precipitation method by adding polyaluminum chloride (PAC) which is an inorganic flocculant to raw water. However, when the raw water has low water quality and includes many suspended solids, a large amount of PAC is required and the suspended solids remain in the treated water, as a result, efficiency of filtration tends to decrease markedly. Therefore, it is difficult to purify the polluted water by this method.

Recently, in the field of water purification techniques, a method of purifying water by filtering and separating treated water flocculated by adding a polymer flocculant to raw water has been investigated in detail, and the method has been reported in the following Non-patent Document 1.

Non-patent Document 1 points out adverse effects such that use of a polymer flocculant causes improvement of the treated water quality, but increase of speed of head losshead loss in the sand filtration though the turbidity of the treated water is decreased and water quality is improved. In particular, there are large adverse effects to the head loss when the condition of flocculation is no good or the polymer flocculant is excessively added. Non-patent Documents 1 indicates that it is difficult to control use conditions such as an appropriate dosage, flocculation condition, injection position, and the like of the polymer flocculant.

Patent Document 1 discloses a method of solid-liquid separation by adding an amphoteric polymer flocculant, as a method of flocculation treatment of sewage. The invention of Patent Document 1 aims to improve the dewaterbility of flocculated sludge, and does not disclose the filtration property of flocculation-treated water.

[Non-patent Document 1] "Guideline of Development Research of Water Purification Techniques for Reduction of Environmental Impact (e-Water)", Japan Water Research Center, August 2005, p. 178 and 201-202

[Patent Document 1] Japanese Unexamined Patent Application, First Publication No. 7-328644

DISCLOSURE OF INVENTION

Problem to be Solved by the Invention

The present invention has been completed in view of the above-mentioned circumstances and an object of the present invention is a provision of a water treatment method which is able to purify polluted water to be water having an effectively usable water quality level.

Means for Solving the Problem

In order to solve the above-mentioned problems, a water treatment method according to the present invention is characterized by adding an amphoteric polymer flocculant to polluted water to flocculate suspended solids so that the polluted water becomes treated water, and filtering the treated water.

The water treatment method may also contain adding an inorganic flocculant to the treated water before filtering.

Effect of the Invention

According to the water treatment method, polluted water can be purified to water having effectively usable water quality level.

BEST MODE FOR CARRYING OUT THE INVENTION

Polluted water to be treated by the water treatment method of the present invention is water containing suspended solids, specific examples include river water, aggregate washed waste water, oil field excavated waste water, paper and pulp waste water, biological treatment water of organic waste water (for example, sewage), and the like.

<Amphoteric Polymer Flocculant>

An amphoteric polymer flocculent in the present invention is a flocculent consisting of polymer compound having at least anionic group and cationic group inside a molecule. Specific examples of anionic groups include carboxy group, sulfonic acid group, and the like. Specific examples of cationic groups include substituent group derived from tertiary amine, substituent group derived from neutralized salt of tertiary amine, substituent group derived from quaternary salt of tertiary amine, and the like.

The polymer compound is obtained by polymerizing an anionic monomer and a cationic monomer. In polymerization of the polymer compound, a nonionic monomer can be used.

Using the nonionic monomer enables the control of the ionic strength of cationic and anionic monomers and enables the production of a flocculant having a high molecular weight.

Examples of polymerization methods include precipitation polymerization, bulk polymerization, dispersion polymerization, and aqueous solution polymerization; however, polymerization methods are not limited to these examples.

Specific examples of cationic monomers include neutralized salt or quaternary salt of dialkylaminoethyl (meth)acrylates, for example, as shown in the following chemical formula (I). One or two or more of cationic monomers can be used.

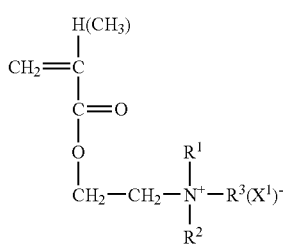

In the formula (I), $R^1$ and $R^2$ each independently represents an alkyl group having 1 to 4 carbons and are the same or different; $R^3$ represents a hydrogen atom, an alkyl group, or a benzyl group; and $X^1$ represents an anion. The anion shown as $X^1$ may be a chloride ion or sulfate ion.

As a specific example of anionic monomer, a vinyl monomer including a carboxy group such as acrylic acid, methacrylic acid, and maleic acid is exemplified. Among vinyl monomers, acrylic acid shown in the following chemical formula (II) is preferable. One or two or more anionic monomers can be used.

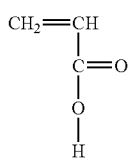

As specific examples of nonionic monomers, (meth)acrylamide and N,N-dimethyl (meth)acrylamide are exemplified. Among these, acrylamide shown in the following chemical formula (III) is preferable. One or two or more nonionic monomers can be used.

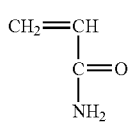

The ratio of anionic units and cationic units in the amphoteric polymer flocculant, namely, the unit ratio of anionic monomer and cationic monomer used for polymerization (mol ratio of anion/cation) is not limited, however, 15/1 to 1/5 is preferable, 10/1 to 1/3 is more preferable. If the amount of anionic monomer is less than the above range, filtration property of treated water is degraded though flocculation property has no problem. If the amount of anionic monomer is more than the above range, solubility of flocculants is decreased and flocculation property is degraded.

If the nonionic monomer is used, the mass ratio of nonionic monomer to the total mass of anionic monomer and cationic monomer (nonion/(anion+cation)) is preferably 15/1 to 1/9, and more preferably 9/1 to 1/4. If the nonionic monomer is not in the range, sufficient addition effects are not obtained.

The amphoteric polymer flocculant has intrinsic viscosity of preferably 5 dl/g or more, more preferably 12 to 18 dl/g when the intrinsic viscosity is measured at 30° C. in 1N sodium nitrate aqueous solution. If the intrinsic viscosity is less than 5 dl/g, cohesion becomes weak and the water quality of treated water is decreased. There is a correlation between the intrinsic viscosity and a molecular mass of the amphoteric polymer flocculant, and the intrinsic viscosity is an index of the molecular mass.

The amphoteric polymer flocculant may be used alone or in combination.

The dosage of the amphoteric polymer flocculant is preferably 0.05 mg/l or more, more preferably 0.1 mg/l or more to the polluted water in order to flocculate suspended solids in the polluted water satisfactorily though the appropriate dosage changes according to the amount of pollutants (suspended solids) in the polluted water. In the present invention, since excess addition of the amphoteric polymer flocculent hardly gives adverse effects in the filtration property, the upper limit of the dosage of the amphoteric polymer flocculant is not especially limited. However, in the point of treatment cost, the dosage of the amphoteric polymer flocculant is preferably 10 mg/l or less, more preferably 5 mg/l or less.

When the amphoteric polymer flocculant is used, a solid acid may be combined in order to improve water solubility and to prevent deterioration of a solution. As the solid acid, sulfamic acid, acidic sodium sulfite, or the like is generally used.

The amphoteric polymer flocculant and the cationic polymer flocculant are used in combination within limits that do not impair the effects of the present invention.

<Inorganic Flocculant>

Specific examples of inorganic flocculants used in the present invention include polyaluminum chloride (PAC), aluminum sulfate, ferric chloride, polyiron sulfate, and the like.

The dosage of the inorganic flocculant is not especially limited and the appropriate amount thereof can be added to the polluted water. If the inorganic flocculent is not necessary, there is no need to add it.

<Water Treatment Method>

The water treatment method of the present invention contains adding an amphoteric polymer flocculant to polluted water, flocculating suspended solids to provide treated water, and filtering the treated water.

Before adding the amphoteric polymer flocculant to the polluted water, an inorganic flocculant can be added to the polluted water.

An inorganic flocculant can be added to the treated water and then the treated water is filtered.

Both before and after the amphoteric polymer flocculant is added to the polluted water, an inorganic flocculant can be added. In this case, the inorganic flocculant before addition of the amphoteric polymer flocculant and the inorganic flocculant after addition of the amphoteric polymer flocculant may be the same or different.

Preferably, the inorganic flocculant is added to the polluted water, and the mixture is sufficiently mixed by stirring. As a method of stirring, a method of generating turbulent flow such as mechanical stirring, line mixing, or the like is used. The mechanical stirring is preferred.

Next, the amphoteric polymer flocculant is added to the mixture and flocculation treatment is carried out by stirring. In this step, suspended solids in the polluted water are flocculated to form floc. As a method of stirring, a method of generating turbulent flow such as mechanical stirring, line mixing, or the like is used. Mechanical stirring is preferred.

Thereafter, the floc are separated to provide treated water, the inorganic flocculent is added to the treated water and mixed, or the treated water is filtered without adding the inorganic flocculant.

As a method of separating floc, known methods such as settlement and precipitation, floatation, or the like can be properly used.

As a filtration treatment, sand filtration or membrane filtration using microfiltration membrane or ultrafiltration membrane is preferably adopted.

When the inorganic flocculant is added to the treated water, the filtration property is improved. The dosage of the inorganic flocculant is not particularly limited; however, if the amount is too small, the effects of addition are not obtained, and if the amount is too large, the sludge to be generated is increased. Therefore, the dosage of a commercial inorganic flocculant to the treated water on an as is basis is preferably 1 to 50 mg/l, and more preferably 5 to 20 mg/l.

According to the present invention, since the flocculation treatment using an amphoteric polymer flocculent is carried out to the polluted water including suspended solids (pollutants), it is unnecessary to control severe use conditions, and satisfactory water quality in the treated water after flocculation treatment is obtained and satisfactory filtration property can be obtained at the same time.

If the water treatment method of the present invention is used, the polluted water including suspended solids (sludge) can be filtered at last to purify the polluted water to be water having effectively usable water quality level.

<Action Mechanism>

The action mechanism of the present invention is proposed as follows.

The polluted water includes suspended solids (SS) which are factors of turbidity and chemical oxygen demand (COD), colloid particles, soluble organic substances, and the like, and shows a negative charge.

In a general operation of conventional flocculation treatment, an inorganic flocculent is added to polluted water to neutralize the charge of the polluted water and flocculate suspended solids; a polymer flocculant is added to generate bulky floc; the bulky floc is flocculated and separated to provide clarified water.

It is reported that, when the flocculation treatment is performed with the polymer flocculant, if the dosage of the polymer flocculant is proper, most polymer flocculent is adsorbed by SS; however, if the dosage is excessive, the adsorption property rapidly decreases and the polymer flocculant remains in the treated water ("Regarding Safety of Polymer Flocculant (Anion/Nonion)" published by Organic flocculant Environmental Council, p. 17-20).

The present inventors presumed that the polymer flocculent which remained in the treated water gave adverse effects to filtration property during sand filtration or membrane filtration, and then studied evaluation of adverse effects by the residual polymer flocculant using the CST test ("Sewage Test Method, First Volume, 1997" edited by Japan Sewage Works Association, p. 308-309).

The CST test is carried out roughly by putting a prepared sample including sludge into a cylinder on a filter paper, and measuring a time (CST value, unit: second) of passing the point-to-point of a concentric circle in which water is sucked by the filter paper and is spread in the circumferential direction with capillarity. The prepared sample is prepared by adding a predetermined amount of flocculant aqueous solution to a sample including sludge and mixing. The CST value obtained by the above process is used as an index of specific resistance to filtration, and is usually used to grasp characteristics of sludge and to determine the dosage of the polymer flocculant.

As a result of that the present inventors have investigated in detail, it has been found that there is a correlation between the residual amounts of polymer flocculant and the value of CST.

Regarding an anionic polymer flocculant, nonionic polymer flocculant, and cationic polymer flocculant, when a CST value of a diluted solution in which only each polymer flocculent is added to water and they are mixed is measured, the CST value is increased according to the concentration of polymer flocculant. The concentration of the diluted solution is within the range of 1 to 10 mg/l which is a general dosage of polymer flocculant in a flocculation treatment.

On the other hand, regarding an amphoteric polymer flocculent, when a CST value of a diluted solution in which an amphoteric polymer flocculant is added to water and they are mixed is measured, the CST value is hardly increased according to the increase of the concentration of polymer flocculant.

In the case that the anionic, nonionic, and cationic polymer flocculants are used, these polymer flocculants are dissolved in water within the range of the above concentration of diluted solution. Therefore, it is considered that viscosity of the diluted solution and the specific resistance to filtration are increased in accordance with the amount of the dissolved polymer flocculent, and then the CST value is increased.

On the other hand, when the amphoteric polymer flocculant is dissolved with a high concentration, the amphoteric polymer flocculant is dissolved by decreasing the pH and then suppressing ion dissociation. However, when the diluted solution is within the range of 1 to 10 mg/l, the amphoteric polymer flocculant is insolubilized by generating intramolecular bond and/or intermolecular bond with ion dissociation of anionic and cationic groups by having a pH close to neutral. As a result, if the concentration of polymer flocculant is increased, it is considered that the viscosity of diluted solution is hardly increased and increase of the CST value is suppressed.

Therefore, it is anticipated that the flocculation treatment with the amphoteric polymer flocculant can prevent the CST value increases due to the residual flocculant and prevent deterioration of filtration properties.

When an inorganic flocculant is added to treated water which is flocculating-treated using the amphoteric polymer flocculent, the inorganic flocculant is reacted with the amphoteric polymer flocculant remaining in the treated solution and then the inorganic flocculant is insolubilized. Therefore, it is considered that the CST value is further decreased and filtration properties are improved.

EXAMPLES

The present invention is explained using examples and comparative examples in detail as follows, however, these are not limited to this range unless a purpose of the present invention is exceeded.

(Flocculant)

In the following examples and comparative examples, a polymer flocculent shown in Table 1 was dissolved in water and used as a 0.1 to 0.3% by mass of aqueous solution.

The intrinsic viscosity of polymer flocculent was measured with Ubbelohde dilution capillary viscometer at the condition of 30 degree Celsius in 1N sodium nitrate solution based on a generally method ("New Edition Polymer Dictionary" edited by Society of Polymer Science, published by Asakura Publishing Co. Ltd., published on Nov. 25, 1988, p. 107).

Polyaluminum chloride (PAC) was used as an inorganic flocculant and used after diluting 10 times with water.

TABLE 1

| | Components and Ratio (% by mass) | Intrinsic viscosity (dl/g) |
|---|---|---|
| R1 | AAm/AA/DME = 50/10/40 | 14.4 |
| R2 | AAm/AA/DMZ = 50/5/45 | 14.0 |
| R3 | AAm/AA/DME/DMC = 40/10/30/20 | 15.2 |
| K1 | AAm/DME = 50/50 | 20.8 |
| K2 | AAm/DME = 80/20 | 16.4 |
| A1 | AAm/AANa = 80/20 | 20.0 |

Abbreviations of components (monomers) in Table 1 are shown below.
AAm: Acrylamide
AA: Acrylic acid
DME: Dimethylaminoethyl acrylate*methylchloride quaternary salt
DMZ: Dimethylaminoethyl methacrylate*sulfate
DMC: Dimethylaminoethyl methacrylate*methylchloride quaternary salt
AANa: Sodium acrylate The above AAm is a nonionic monomer, DME, DMC, and DMZ are cationic monomers, AA and AANa are anionic monomers, Therefore, R1 to R3 are amphoteric polymer flocculants, K1 and K2 are cationic polymer flocculants, and A1 is an anionic polymer flocculent.
(Measuring Method)

Each characteristic of the following examples and comparative examples was measured by the following method.
SS concentration: SS concentration was measured based on a general method ("Sewage Test Method, First Volume, 1997" edited by Japan Sewage Works Association, published on Aug. 25, 1997, p. 116)
Turbidity: Turbidity was measured based on a measuring method of transmitted light ("Sewage Test Method, First Volume, 1997" edited by Japan Sewage Works Association, published on Aug. 25, 1997, p. 103)
CST value: CST value was measured based on the above CST test. The larger the value of CST, the bigger the filtering specific resistance shows poor filtration properties.
Average particle size of floc: Average particle size of floc was measured by visual.
Settling time of floc: After stirring, measured the time by a timer until most of floc settled on the bottom of the beaker by visual.

Examples 1 to 3

Flocculation treatment was carried out with extracting river water A.
The characteristic of the river water A was pH=6.5, SS concentration=21 mg/l, turbidity=8.5 NTU, and CST value=9.0.
At first, 500 ml of river water was extracted into a 500 ml beaker, and added 30 mg/l of PAC as an inorganic flocculant, then stirred and mixed for 1 minute at 150 rpm rotation frequency.

Next, the amount of amphoteric polymer flocculants which are described in Table 2, was added as shown in Table 2, and also stirred for 2 minutes at 100 rpm rotation frequency to form floc.
After measuring the average particle size and the Settling time of floc, keep the floc in static for 2 minutes, and the treated water placed at 5 cm depth from the surface was extracted. The water quality of the extracted treated water (turbidity and CST value) was measured. The results are shown in Table 2.

Comparative Examples 1 to 3

As shown in Table 2, other than changing the amphoteric polymer flocculent to cationic polymer flocculant or anionic polymer flocculant, flocculation treatment was performed in the same manner as example 1. Each property was measured in the same manner as Example 1. The results are shown in Table 2.

TABLE 2

| | Inorganic flocculant | | Polymer flocculant | | Floc: Average particle size (mm) | Floc: Settling time (second) | Water quality of treated water | |
|---|---|---|---|---|---|---|---|---|
| | Kinds | Dosage (mg/L) | Kinds | Dosage (mg/L) | | | Turbidity (NTU) | CST value (second) |
| Ex. 1 | PAC | 30 | R1 | 0.3 | 4 | 20 | 0.15 | 8.5 |
| Ex. 2 | PAC | 30 | R2 | 0.3 | 3 | 25 | 0.16 | 8.5 |
| Ex. 3 | PAC | 30 | R3 | 0.3 | 4 | 20 | 0.15 | 8.5 |
| Comp. Ex. 1 | PAC | 30 | K1 | 0.3 | 2 | 50 | 0.18 | 9.8 |
| Comp. Ex. 2 | PAC | 30 | K2 | 0.3 | 2 | 50 | 0.20 | 10.3 |
| Comp. Ex. 3 | PAC | 30 | A1 | 0.3 | 5 | 20 | 0.22 | 13.6 |

As shown in Table 2, in Examples 1 to 3, floc having high settling velocity and large particle size is formed, and satisfactory flocculation properties are obtained. The treated water shows excellent water quality with low turbidity, and superior filtration properties with low CST value.
Compared to the above results, in Comparative Examples 1 and 2 each using the cationic polymer flocculant, each of flocculation properties, water quality of treated water, and filtration properties (CST value) are inferior. In particular, the CST value is worse than the value (9.0 seconds) of untreated river water.
In Comparative Example 3 using the anionic polymer flocculent, flocculation properties are excellent; however, turbidity and filtration properties (CST value) of the treated water are substantially inferior.

Examples 4 to 6

Waste water by excavation in oil filed H was extracted and flocculation treatment was performed.
The characteristics of the waste water were pH=7.8, SS concentration=76 mg/l, and CST value=104 seconds.
First, 500 ml of waste water by excavation in oil field were extracted to 500 ml beaker; 80 mg/l of PAC were added to the waste water, then the mixture was stirred and mixed for 1 minute at 150 rpm rotation frequency. After that, other than changing the dosage of the polymer flocculant to 2.0 mg/l, flocculation treatment was performed in the same manner as Examples 1 to 3.
The average particle size and settling time of floc, and the CST value of the treated water were measured in the same manner as Example 1. SS concentration of the extracted treated water was measured. The results are shown in Table 3.

Comparative Examples 4 to 6

As shown in Table 3, flocculation treatment was performed in the same manner as Example 4, other than changing the amphoteric polymer flocculant to the cationic polymer flocculant or anionic polymer flocculent. Each property was measured in the same manner as Example 4. The results are shown in Table 3.

TABLE 3

| | Inorganic flocculant | | Polymer flocculant | | Floc: Average particle size (mm) | Floc: Settling time (second) | Water quality of treated water | CST value (second) |
|---|---|---|---|---|---|---|---|---|
| | Kinds | Dosage (mg/L) | Kinds | Dosage (mg/L) | | | SS (mg/L) | |
| Ex. 4 | PAC | 80 | R1 | 2.0 | 5 | 15 | 2 | 8.7 |
| Ex. 5 | PAC | 80 | R2 | 2.0 | 4 | 17 | 2 | 8.5 |
| Ex. 6 | PAC | 80 | R3 | 2.0 | 5 | 15 | 2 | 8.8 |
| Comp. Ex. 4 | PAC | 80 | K1 | 2.0 | 3 | 35 | 5 | 9.8 |
| Comp. Ex. 5 | PAC | 80 | K2 | 2.0 | 3 | 40 | 6 | 10.3 |
| Comp. Ex. 6 | PAC | 80 | A1 | 2.0 | 5 | 15 | 4 | 15.5 |

As shown in Table 3, in Examples 4 to 6, satisfactory flocculation properties are obtained.

The treated water shows excellent water quality with low SS concentration and superior filtration properties with low CST value.

Compared to the above results, in Comparative Examples 4 and 5 each using the cationic polymer flocculant, each of flocculation properties, water quality of treated water, and filtration properties (CST value) are inferior.

In Comparative Example 6 using the anionic polymer flocculant, flocculation properties are excellent; however, SS concentration and filtration properties (CST value) of the treated water are inferior. In particular, the CST value is substantially worse than the value (10.4 seconds) of untreated river water.

Example 7

Extra Addition of Polymer Flocculant

The flocculation treatment was performed in the same manner as Example 1 other than changing the dosage of the amphoteric polymer flocculant to 3 mg/l which was 10 times (extra addition) of Example 1. After stirring was completed, kept it for 2 minutes in static, and the treated water extracted in the same manner as Example 1, and then the water quality (turbidity and CST value) thereof was measured. The results are shown in Table 4.

Example 8

Extra Addition of Polymer Flocculant, Further Addition of Inorganic Flocculant after Flocculation Treatment Flocculation treatment was performed and the treated water was extracted in the same manner as Example 7. 100 ml of the treated water were extracted from 5 cm depth of the surface after settling. 10 mg/l of PAC were further added to the treated water and the mixture was stirred and mixed for 1 minute at 150 rpm rotation frequency. After that, the CST value was measured. The results are shown in Table 4.

Comparative Examples 7 and 8

Extra Addition of Polymer Flocculant

As shown in Table 4, flocculation treatment was performed in the same manner as Example 7 other than changing the amphoteric polymer flocculant to the cationic polymer flocculant or anionic polymer flocculant. Each property was measured in the same manner as Example 7. The results are shown in Table 4.

Comparative Example 9

Extra Addition of Polymer Flocculant, Further Addition of Inorganic Flocculant after Flocculation Treatment Flocculation treatment was performed in the same manner of Comparative example 8, and the treated water was extracted and the CST value was measured in the same manner as Example 8. The results are shown in Table 4.

TABLE 4

| | Inorganic flocculant | | Polymer flocculant | | Treated water | | Treated water + PAC addition treatment | |
|---|---|---|---|---|---|---|---|---|
| | Kinds | Dosage (mg/L) | Kinds | Dosage (mg/L) | Turbidity (NTU) | CST value (second) | PAC dosage (mg/L) | CST value (second) |
| Ex. 7 | PAC | 30 | R1 | 3.0 | 0.13 | 9.2 | — | — |
| Ex. 8 | PAC | 30 | R1 | 3.0 | 0.13 | 9.2 | 10 | 8.5 |
| Comp. Ex. 7 | PAC | 30 | K2 | 3.0 | 0.18 | 15.8 | — | — |
| Comp. Ex. 8 | PAC | 30 | A1 | 3.0 | 0.20 | 26.1 | — | — |
| Comp. Ex. 9 | PAC | 30 | A1 | 3.0 | 0.20 | 26.1 | 10 | 20.6 |

According to the results of Table 4, though the CST value of the treated water of example 7 was increased a little in comparison with that of example 1, it is an excellent value. It is found that increase of CST value due to the residual flocculent, namely, deterioration of filtration properties is hardly generated.

On the other hand, CST values in comparative examples 7 and 8 are extremely high, and those have been drastically increased even in comparison with each example 2 and 3.

In example 8, the CST value was decreased as well as example 1 after adding an inorganic flocculant to the treated water after flocculation treatment.

In comparative example 9, the CST value was decreased in the same level in example 3 after adding an inorganic flocculent to the treated water after flocculation treatment, however, the value was higher compared to examples 1 to 3. In addition, large amount of PAC were needed to be added in comparison with example 8.

Example 9

Example 3+Sand Filtration 1 m³ of river water A was extracted into a dilite tank being 1 m³ (1060 mm diameter×1225 height), 30 mg/l of PAC was added as an inorganic flocculant, and they were mixed by stirring for one minutes at 150 rpm rotation frequency.

Next, 0.3 mg/l of the amphoteric polymer flocculent (R3) which was the same of that of example 3 was added to the tank, and they were mixed by stirring for two minutes at 100 rpm rotation frequency to form floc.

After standing the tank for five minutes, 500 l (liter) of the treated water placed at 60 cm depth from the surface was extracted and the extracted water was stored in the other dailite tank.

SS concentrations and CST values of the extracted treated water were measured. The results are shown in Table 5.

The obtained treated water was filtered by sand filtration in the following conditions, and time until head loss reaches 800 mm was measured. The results are shown in Table 5.
Filtration column: glass cylinder of 50 mm diameter and 1000 mm height
Filler: fill sand having 0.6 mm diameter until 400 mm height
Filtration type: downward flow by gravity
Filtration speed (Lv): 240 m/D
Evaluation: The time until head loss reaches 800 mm was 42 hours, therefore, long time operation was possible. The turbidity of the filtered water was 0.1 or less, so the result was very excellent.

Comparative Example 10

Comparative Example 3+Sand Filtration

The treated water was obtained by the same method of example 9 except changing the amphoteric polymer flocculant to an anionic polymer flocculant (A1), and sand filtration was carried out.

The measurement results of SS concentrations and CST values of the treated water, and measurement results of time until head loss reaches 800 mm in the sand filtration are shown in Table 5.

The time until head loss reaches 800 mm was 16 hours, the head loss was increased for a very short time in comparison with example 9, and filtration became difficult.

TABLE 5

| | Inorganic flocculant | | Polymer flocculant | | Floc: Average diameter (mm) | Water quality of treated water | | Time until head loss reaches 800 mm (hour) |
|---|---|---|---|---|---|---|---|---|
| | Kinds | Dosage (mg/L) | Kinds | Dosage (mg/L) | | SS (mg/L) | CST value (second) | |
| Ex. 9 | PAC | 30 | R3 | 0.3 | 5 | 2 | 8.7 | 42 |
| Comp. Ex. 10 | PAC | 30 | A1 | 0.3 | 5 | 4 | 15.5 | 16 |

Example 10

Example 3+Membrane Filtration

Flocculation treatment was carried out to river water A using the same method of example 9 to obtain treated water.

SS concentrations and CST values of the extracted treated water were measured. The measurement results are shown in Table 6.

The obtained treated water was filtered by a hollow fiber membrane in the following conditions, and corrected transmembrane pressure difference after passing 50 days was measured. The results are shown in Table 6.

Kind of membrane: hollow fiber membrane
Nominal pore size: 0.1 μm
Module size: 89 mm φ×1126 mml
Material of membrane: PVDF
Filtration type: external pressure dead end filtration
Flux: 3.0 m³/m² D
Washing interval: 30 minutes/filtration
Evaluation: The corrected transmembrane pressure difference after passing 50 days increased only 25 kPa, namely, changed from 50 kPa to 75 kPa, this was extremely excellent result. The turbidity of the filtered water was 0.1 or less, this was excellent result.

Comparative Example 11

Comparative Example 3+Membrane Filtration

The treated water was obtained by the same method of example 110 except changing the amphoteric polymer flocculant to an anionic polymer flocculant (A1), and membrane filtration using hollow fiber membranes was carried out.

The measurement results of SS concentrations and CST values of the treated water, and measurement results of corrected transmembrane pressure difference after passing 50 day in the membrane filtration using hollow fiber membranes are shown in Table 6.

The corrected transmembrane pressure difference after passing 50 days was increased up to 144 kPa, namely, increased from 61 kPa to 205 kPa, so that chemical washing was needed. Comparative example 11 is inferior to example 10 in the filtration properties.

TABLE 6

| | Inorganic flocculant | | Polymer flocculant | | Floc: Average | Water quality of treated water | | Increased value of corrected transmembrane pressure difference |
|---|---|---|---|---|---|---|---|---|
| | Kinds | Dosage (mg/L) | Kinds | Dosage (mg/L) | diameter (mm) | SS (mg/L) | CST value (second) | after passing 50 days (KPa) |
| Ex. 10 | PAC | 30 | R3 | 0.3 | 5 | 2 | 8.7 | 25 |
| Comp. Ex. 11 | PAC | 30 | A1 | 0.3 | 5 | 4 | 15.5 | 141 |

INDUSTRIAL APPLICABILITY

The water treatment method of the present invention enables various industrial waste water and polluted water to effectively purify to be water having usable water quality level for domestic or industrial use.

What is claimed is:

1. A water treatment method comprising:
   first, adding at least one inorganic flocculant to polluted water before at least one amphoteric polymer flocculant is added to the polluted water,
   subsequently, adding the at least one amphoteric polymer flocculant to polluted water to flocculate suspended solids so that the polluted water becomes treated water,
   at last, adding at least one inorganic flocculant to the treated water, and
   filtering the treated water,
   wherein the filtration is provided by at least one membrane selected from the group consisting of a microfiltration membrane, an ultrafiltration membrane, and sand, and
   wherein a mole ratio of anionic units and cationic units in the amphoteric polymer flocculant is from 15/1 to 1/5.

2. The water treatment method according to claim 1, wherein the polluted water is river water, aggregate washed waste water, oil field excavated waste water, paper and pulp waste water, biological treatment water of organic waste water, or a combination thereof.

3. The water treatment method according to claim 1, wherein the amphoteric polymer flocculant comprises at least one anionic group and at least one cationic group in a molecule.

4. The water treatment method according to claim 1, wherein the amphoteric polymer flocculant is obtained by polymerizing at least one anionic monomer and at least one cationic monomer.

5. The water treatment method according to claim 1, wherein the amphoteric polymer flocculant is obtained by polymerizing at least one anionic monomer, at least one cationic monomer and at least one nonionic monomer.

6. The water treatment method according to claim 4, wherein the cationic monomer is a neutralized salt or a quaternary salt of dialkylaminoethyl (meth)acrylates.

7. The water treatment method according to claim 4, wherein the anionic monomers is a vinyl monomer comprising a carboxy group.

8. The water treatment method according to claim 7, wherein the vinyl monomer is at least one selected from the group consisting of acrylic acid, methacrylic acid, and maleic acid.

9. The water treatment method according to claim 1, wherein the amphoteric polymer flocculant has a intrinsic viscosity of 5 dl/g or more, and the intrinsic viscosity is measured at 30° C. in 1N sodium nitrate aqueous solution.

10. The water treatment method according to claim 5, wherein a mass ratio of nonionic monomers to the total mass of anionic monomers and cationic monomers is from 15/1 to 1/9.

11. The water treatment method according to claim 1, wherein a content of the amphoteric polymer flocculant is 0.05 mg/l or more based on the amount of the polluted water.

12. The water treatment method according to claim 1, wherein the inorganic flocculant is at least one selected from the group consisting of polyaluminum chloride (PAC), aluminum sulfate, ferric chloride, and polyiron sulfate.

13. The water treatment method according to claim 1, wherein a content of the inorganic flocculant is from 1 to 50 mg/l based on the amount of the treated water.

* * * * *